R. J. TALBOT.
AUTOMOBILE TOP.
APPLICATION FILED JULY 21, 1917.
1,298,122.
Patented Mar. 25, 1919.
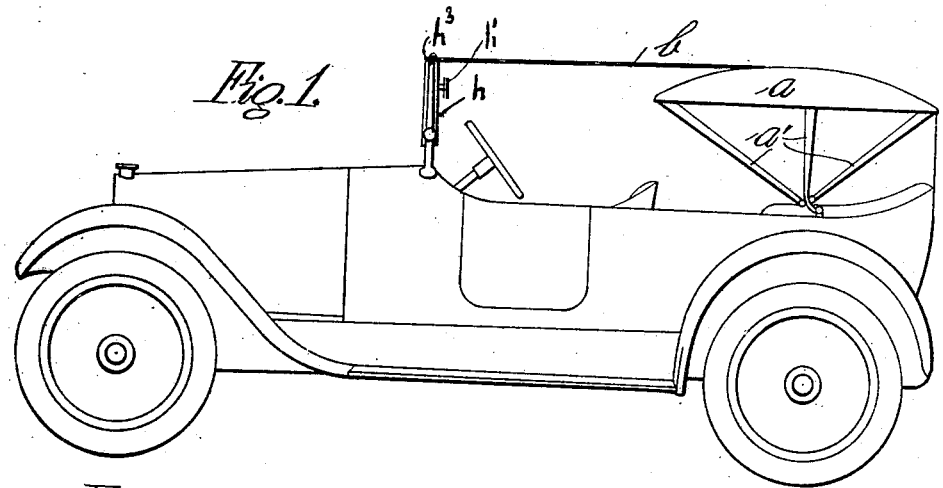
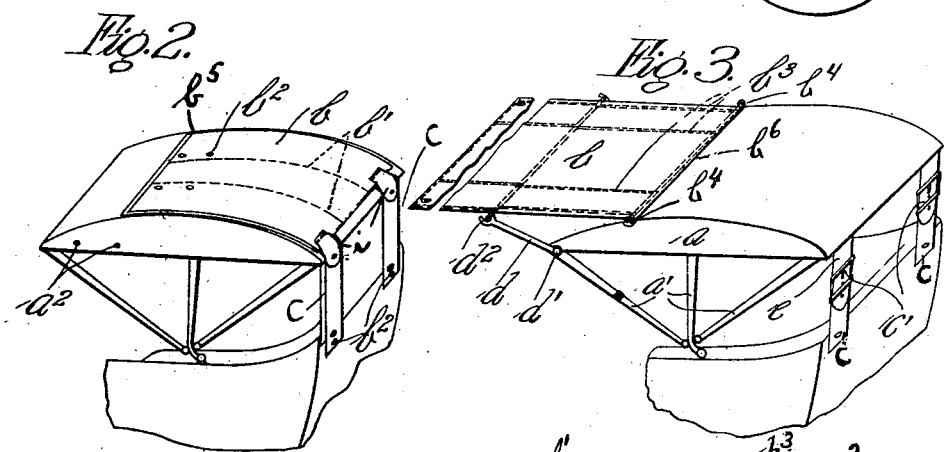
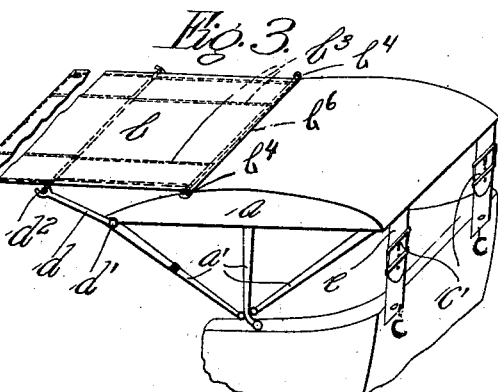
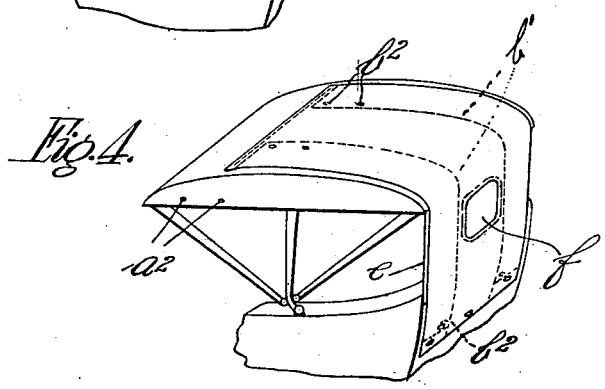
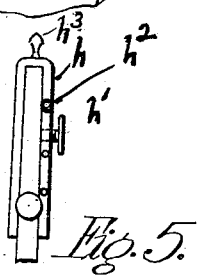
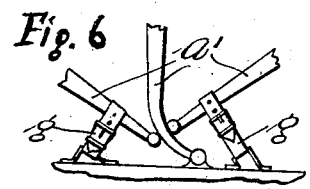
WITNESSES:
W. C. Ross.
Helen Quinn.
INVENTOR.
Richard J. Talbot

UNITED STATES PATENT OFFICE.

RICHARD J. TALBOT, OF SPRINGFIELD, MASSACHUSETTS.

AUTOMOBILE-TOP.

1,298,122.  Specification of Letters Patent.  Patented Mar. 25, 1919.

Application filed July 21, 1917. Serial No. 182,050.

*To all whom it may concern:*

Be it known that I, RICHARD J. TALBOT, a citizen of the United States, residing at Springfield, in the county of Hampden and State of Massachusetts, have invented certain new and useful Improvements in Automobile-Tops, of which the following is a specification.

My invention relates to improvements in automobile tops and has for its object to provide a combination top for automobiles which may be used as a shelter over the tonneau in mild weather without also necessarily being extended over the front seats but which in stormy weather or when desired, may be readily extended; and further the said invention permits a top of the Victoria type to be used without sacrificing the protection in an emergency which an extension top furnishes.

The section over the tonneau may be tilted at any convenient angle.

I am aware that tops of the Victoria type are in common use on automobiles at the present time and that certain types of extension tops attached to a frame are also in use, but the former has the disadvantage of not sheltering the occupants of the front seats and the latter has the disadvantage that it can be used only when fully extended over both front and rear seats. In this improved construction a means is provided for sheltering the occupants of the rear seats while the front seats are uncovered, and it also provides a complete top covering the interior of the car when such additional shelter is desired.

I attain these objects by the means illustrated in the accompanying drawings, in which—

Figure 1 shows an automobile having a top of the Victoria type equipped with an extension.

Fig. 2 shows a top with the extension folded back and held in place and having curtains attached.

Fig. 3 shows a detachable extension with wires inserted to strengthen it and having also support from the frame of the rear section.

Fig. 4 shows a top with the extension stitched to it and held back by means of buttons.

Fig. 5 shows supports for the front of extension, which supports are detachably fastened to the windshield frame of the automobile.

Fig. 6 represents strap supports for the frame.

$a$ represents a top of the Victoria type; $a'$ represents the supports of the top; $a^2$ represents fasteners; $b$ represents an extension of the top; $b'$ represents sides which may be folded; $b^2$ represents holes which are used when connecting the same to fasteners $a^2$; $c$ represents straps which may be attached to buttons or made more adjustable by buckles $c'$.

In Fig. 2 is shown the permanent attachment of the extension to the top by means of stitching.

It is apparent that for cars having an extremely long body it may be necessary to support the extension at a point intermediate of its attachment to the Victoria top and its attachment to the windshield.

For a support, I provide a hinged arm $d$ which when not in use, is connected to the bolt $d'$ but if it is desired to support the extension top, the arm is then folded upward and connected with the bolts $d^2$. When I find it necessary to make the extension more rigid from the point of attachment with the rear section to the place where it is supported at $d^2$, I insert wires at $b^3$, providing a frame. The wires may be of flexible construction so as to permit them to fold backward over the rear section; at $b^5$ a wire or other support is also inserted to give rigidity to the front of extension.

$e$ is an extra curtain; $f$ represents windows in the curtain and extension; $g$ represents straps; $h$ represents attachment for fastening the extension to the windshield. The attachment is provided with a thumbscrew $h'$ for holding it securely in place and with a projection $h^3$ as a receptacle for apertures in the extension $b$ and may be further provided with projections $h^2$ for supporting side curtains.

I do not limit the construction to any particular method or place of attaching the extension $b$ to the windshield frame, although I show a method of attachment. It is apparent that buttons, clamps or straps may be provided in place of the attachment $d$.

For holding the extension in place when not in use for shelter, the projections $i$ may be placed on the extension $b$ which may be fastened to the straps $c$.

When the extension $b$ is used with the side curtains $b'$ the side curtains may be fastened to the rear section $a$, by the buttons $a^2$ and the holes $b^2$, and to the front support at $h^2$.

The extension as shown on Fig. 3 is made removable by means of the nuts $b^4$ and the rod $b^6$.

The device may be constructed as in Fig. 7 without sides and extended as therein shown and folded in two or more folds when not in use as shown in Fig. 2 or folded entirely back as in Fig. 3, or it may have sides as in Fig. 2 and Fig. 3. It may be more rigid and made with supports as in Fig. 4. If the construction shown in Fig. 2 or in Fig. 3 is used, when it is desired to extend the top and use the sides, the extension is disconnected at the rear, brought forward and attached to the windshield frame, the sides are then lowered and attached to the frame at the side of windshield at $h^2$ and to the buttons $a^2$ on the frame of the rear section, making a side protection as well as an overhead protection. The windows $f$ should be made of a transparent waterproof substance, preferably celluloid.

The straps $c$ being made adjustable provide means for tightening the top when it is extended.

The side curtains are represented as providing shelter only along the edge of the top. Side curtains for the entire sides of the body, such as those in ordinary use, may be adjustably attached thereto.

Having thus described my invention, what I claim as new and desire to secure by Letters Patent is—

1. In combination, a rear section of an automobile top, a flexible extension attached to the upper portion of the rear top section in rear of the front edge thereof, means engaging the front end of the extension to hold same extended in front of the rear section, means for holding the flexible extension back flat on the upper side of the rear top section, side curtains attached to the sides of the extension and adapted to be folded inwardly toward each other to lie close to the surface when the extension is back on the rear top section, and means for fastening the side curtains to hold them in vertical position when the extension is extended forwardly.

2. In combination, a rear top section of a vehicle, a wind shield spaced from the front edge of the rear top section, a flexible extension adapted to extend between the upper part of the rear top section and the wind shield, a flexible frame forming a part of the extension, means for permanently securing the rear edge of the extension to the rear top section in rear of the front edge of the latter, means between the front edge of the extension and the wind shield to hold the extension in extended position, rods and supports for further supporting the extension in extended position, and means for holding the extension flat on the outer surface of the rear top section when folded back and out of use.

3. In combination, a rear top section of a vehicle, a forward support spaced from the rear top section, an extension fastened at its rear edge to the outer surface of the rear top section, said extension being of sufficient length to extend over the outer upper and rear surface of the rear top section, foldable side curtains attached to the extension and adapted to be let down substantially vertical when the section is extended to the support, means between the support and the extension to hold the latter in extended position, means between the rear top section and the side curtains and between the latter and the support to secure the side curtains in substantially vertical position, and means to fasten the extension and the side curtains over the outside of the rear top section when said extension is not in use whereby to form a rear curtain for the rear top extension.

4. In combination, a rear top section of a vehicle, a support spaced from the front of the rear top section, a flexible extension attached to the upper surface of the rear top section in rear of the front edge thereof and adapted when in one position to be extended forwardly and attached at its front edge to the support, and adapted when not in use to lie flat its full length on the upper surface of the rear top section, and means on the rear top section to secure the extension when same is not in use.

5. In combination, a rear top section of a vehicle, a support spaced from the front of the rear top section, a flexible extension attached to the upper surface of the rear top section in rear of the front edge thereof, said extension being of sufficient length to extend over the outer upper and rear surfaces of the rear top section, whereby to form a rear curtain, and means for securing the free end of the extension, the extension when extended forwardly of the rear top section being fastened to the support, whereby to provide a forward top section for the vehicle.

In testimony whereof I have affixed my signature in presence of two witnesses.

RICHARD J. TALBOT.

Witnesses:
 HELEN I. QUINN,
 SIMON J. GRIFFIN.